Nov. 15, 1932.  H. J. WINTER  1,887,572
FLUID PRESSURE BRAKING APPARATUS FOR VEHICLES
Filed Dec. 2, 1930
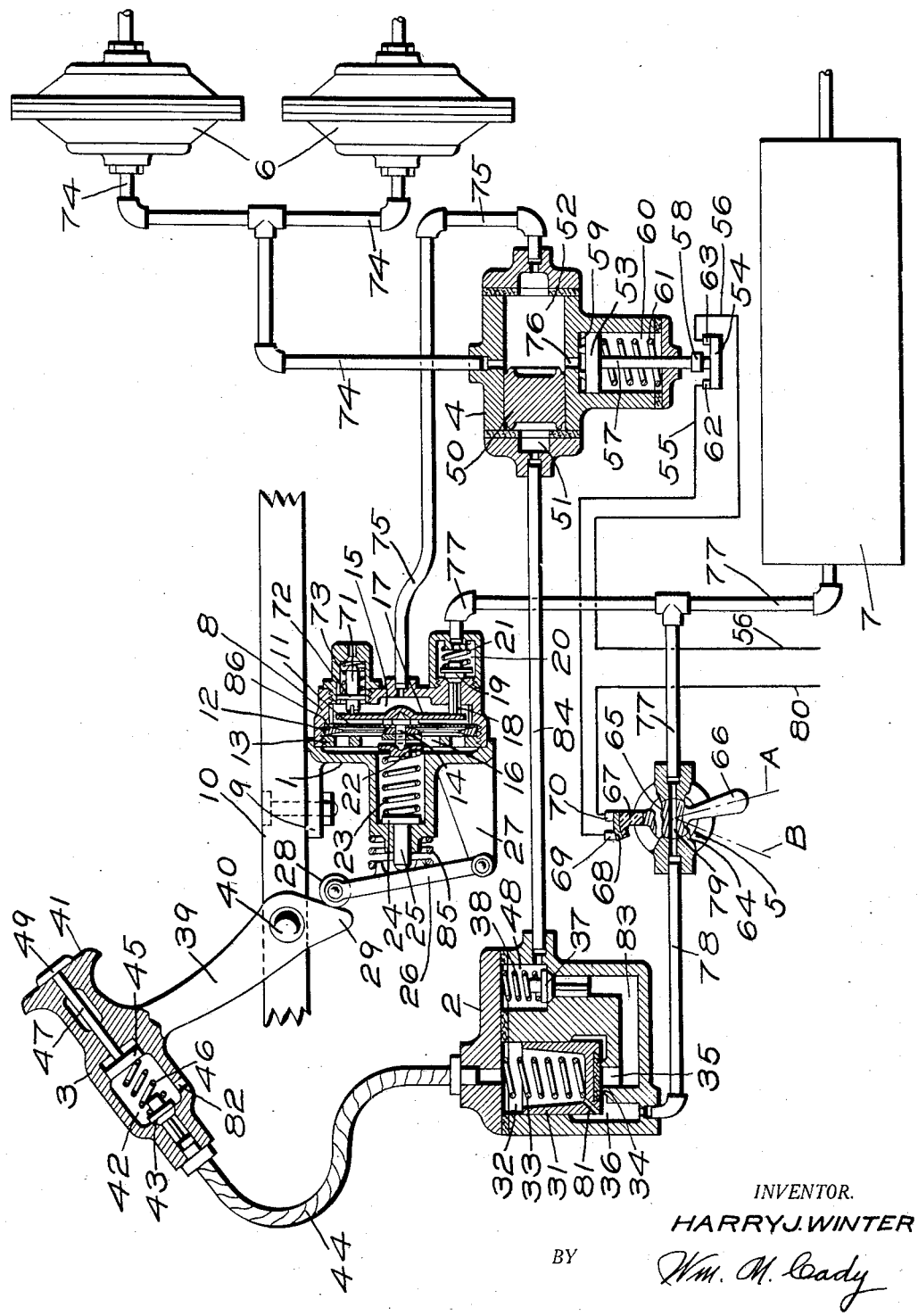
INVENTOR.
HARRY J. WINTER
BY
Wm. M. Cady
ATTORNEY.

Patented Nov. 15, 1932

1,887,572

UNITED STATES PATENT OFFICE

HARRY J. WINTER, OF LONDON, ENGLAND, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKING APPARATUS FOR VEHICLES

Application filed December 2, 1930, Serial No. 499,501, and in Great Britain December 2, 1929.

This invention relates to fluid pressure brakes and more particularly to the type employed on vehicles of the bus type in which the brakes are controlled by the operation of a foot pedal.

One object of the invention is to provide an improved brake apparatus of the above type in which the operator must at all times maintain his foot upon the brake pedal in order to prevent the brakes from being automatically applied.

A vehicle of the bus type may be propelled by an electric motor or by an internal combustion engine. If the circuit through the electric motor is opened or if the ignition circuit of the internal combustion engine is opened, the power unit of the vehicle is rendered inoperative.

Another object of the invention is to provide an improved braking apparatus for a vehicle having means for rendering the power unit on the vehicle inoperative when the brakes are applied.

In the accompanying drawing, the single figure is a diagrammatic view, mainly in section, of a fluid pressure brake apparatus embodying my invention.

As shown in the drawing, the fluid pressure brake apparatus may comprise a brake valve device 1, an emergency valve device 2, a pedal device 3 for controlling the operation of said brake valve device 1 and said emergency valve device 2, a combined double check valve and circuit breaker device 4, a cut-out cock and circuit breaker device 5, brake cylinders 6 and a fluid pressure reservoir 7.

The brake valve device 1 comprises a casing 8 supported by a bracket 9 which is secured to any stationary portion of a vehicle such as the floor 10. The casing 8 contains a flexible diaphragm 11 clamped between a follower ring 12 and a shoulder 86 in the casing by a nut 13 having screw-threaded engagement therein. Centrally secured to the diaphragm 11 is an operating pin 14, one end of which is disposed in chamber 15 at one side of the diaphragm and the other end is disposed in chamber 16 at the other side of said diaphragm. In chamber 15, the pin 14 engages an operating member 17, one end of which engages the fluted stem 18 of an application valve 19 which is contained in a chamber 20 and is subject to the pressure of a spring 21. The other end of the member 17 engages the stem of an exhaust valve 71 which is mounted in an extension of chamber 15. A collar 72 is provided on the stem of exhaust valve 71 and is acted upon by a spring 73 for unseating said valve.

A spring seat 22 engages the end of the operating pin 14 in the chamber 16 and a spring 23 is interposed between the seat 22 and a movable seat 24. The spring seat 24 is carried by an operating pin 25 slidably mounted in a suitable bore in the casing and extending therethrough into engagement with a lever 26, one end of which is pivotally mounted on a bracket 27 projecting from the casing. The other end of the lever 26 is preferably provided with a roller 28 adapted to be engaged by arm 29 of the pedal lever as will hereinafter be described. A return spring 85 is interposed between the casing and lever 26 to urge said lever away from the casing.

The emergency valve device 2 comprises a casing containing a movable valve piston 31 having at one side a chamber 32 containing a spring 33 for urging said valve piston into engagement with a seat rib 34, in which position, a chamber 35 within the seat rib is disconnected from a chamber 36 outside of the seat rib. The casing also has a chamber 48 containing a check valve 37 and a spring 38 of predetermined value acting on said check valve.

The pedal device 3 comprises a lever 39 pivotally mounted on a pin 40 in the vehicle floor and having at one end the arm 29 adapted to engage the roller 28 of the brake valve lever 26.

The other end of the lever 39 is provided with a foot plate 41 and has a chamber 42 containing a valve 43 for controlling communication from the emergency valve piston chamber 32 to chamber 42 through a flexible conduit 44. A plunger 45 and a spring 46 interposed between said plunger and the valve 43 are also disposed in the chamber 42, said plunger having a stem 47 slidably mounted in a suitable bore in the lever and extending through the foot plate 41. The outer end of stem 47 is provided with a button-shaped head 49 also adapted to be engaged by the foot of an operator.

The combined double check valve and circuit breaker device 4 comprises a casing containing a movable check valve 50 having at one side a chamber 51 and at the other side a chamber 52. The circuit breaker is preferably associated with the double check valve and comprises a piston 53 and a movable switch contact 54 for controlling the circuit through wires 55 and 56 and operatively connected to the piston 53 by a stem 57 having an insulating portion 58. The piston 53 has at one side a chamber 59 and at the other side a chamber 60, a spring 61 being disposed in chamber 60 for urging the piston 53 and switch contact 54 to their normal position as shown in the drawing, in which position, contact 54 engages fixed contacts 62 and 63 for closing the control circuit of the vehicle power unit.

The combined cut-out cock and circuit breaker device 5 are preferably associated with each other for reasons which will be evident from the following description of the operation of the apparatus, and comprise a casing 64 containing a plug valve 65 adapted to be operated by a handle 66. The plug valve 65 is provided with a projection 67 carrying on its outer, arcuate shaped face a movable contact 68 for connecting stationary contacts 69 and 70, the projection 67 being preferably of insulating material.

In operation, when the brakes are released, the brake apparatus is normally in the position shown in the drawing in which spring 23 of the brake valve device 1 holds the spring seat 24 in engagement with the casing, which permits spring 21 to seat the application valve 19 and spring 73 to unseat the exhaust valve 71. With the exhaust valve unseated, the brake cylinders 6 are open to the atmosphere through pipe 74, chamber 52 in the double check valve device 4, pipe 75, chamber 15 in the brake valve device and past the unseated exhaust valve 71. The double check valve 50 is normally in the position shown in the drawing, as will be hereinafter more fully described. Piston chamber 59 of the circuit breaker device is also open to the atmosphere through passage 76, and chamber 52 of the double check valve device which permits spring 61 to hold the piston 53 in its inner position in which the movable switch contact 54 connects the fixed contacts 62 and 63.

With the brake valve device 1 in the release position, as above described, the levers 26 and 39 are held in the position shown in the drawing by the spring 85, in which position, no foot pressure is applied to the foot plate 41, but the foot of the operator holds the button-shaped head 49 in engagement with the foot plate 41. With head 49 in this position, spring 46 is compressed a certain amount and the compressive force of said spring seats the valve 43.

The cut-out cock and circuit breaker device 5 normally connects pipes 77 and 78 through a port 79 in the plug valve 65, and the movable contact 68 bridges the fixed contacts 69 and 70. With the fixed contacts 69 and 70 thus connected by the movable contact 68, and the fixed contacts 62 and 63 connected by the movable contact 54 of the double check valve circuit breaker device, the control wires 56, 55 and 80 are connected in circuit, so that the control circuit of the bus power unit may be closed to operate the bus.

Fluid under pressure is supplied to the reservoir 7 in the usual well known manner and flows therefrom through pipe 77 to the application valve chamber 20 in the brake valve device, and also through port 79 in the cut-out cock device 5 and pipe 78 to chamber 36 in the emergency valve device 2. From chamber 36 fluid under pressure flows through port 81 in the valve piston 31 to chamber 32 and from thence through the conduit 44 to the lower side of the valve 43 in the pedal device 3. The valve 43 being held seated by the operator's foot, the pressure builds up in chamber 32 and beneath the valve 43 in the pedal device to equalization with the reservoir pressure in chamber 36 and the spring 33 holds the valve piston 31 seated against the seat rib 34.

To effect an application of the brakes, the operator pushes the pedal lever 39 in a counter-clockwise direction and in so doing maintains the button 49 in engagement with the foot plate 41. This movement of lever 39 operates lever 26 to move spring 23 inwardly of the brake valve device so as to exert a pressure on the diaphragm 11. The pressure thus applied to the diaphragm deflects it toward the right which operates the member 17 to seat the exhaust valve 71 against the opposing pressure of spring 73. After the exhaust valve is thus seated, the member 17 pushes the application valve 19 away from its seat against the pressure of spring 21 which is of greater value than the exhaust valve spring 73.

With the application valve 19 unseated, fluid at the pressure carried in the reservoir 7 flows from chamber 20 to chamber 15 and from thence through pipe 75, chamber 52 in the double check valve device 4 and pipe 74 to the brake cylinders 6, thereby applying the brakes. When the pressure in the brake cylinder 6, which is effective in chamber 15 on the diaphragm 11, builds up sufficiently to overbalance the opposing force of spring 23 acting on the other side of the diaphragm, the diaphragm is deflected to the left. This permits the application valve 19 to be seated by spring 21, thereby cutting off the supply of fluid to the brake cylinders and limiting the brake cylinder pressure to a degree in proportion to the movement of the pedal device, and consequent compression of spring 23 in the brake valve device.

To obtain the maximum brake cylinder pressure by operation of the brake valve device, the pedal device is depressed to the position in which the brake valve spring 23 is compressed its maximum amount by the limited movement of the brake valve lever 26 and in this position the application valve 19 remains unseated and the pressures in the reservoir 7 and brake cylinders 6 equalize, since the reservoir pressure acting on diaphragm 11 is insufficient to deflect said diaphragm toward the left against the force of spring 23, under this condition.

To release the brakes after an application, the pressure of the operator's foot on the pedal device foot plate 41 is relieved so as to permit the pedal lever 39 and brake valve device lever 26 to be returned to their normal position, as shown in the drawing, by the expansive force of springs 85 and 23 in the brake valve device and by the pressure of fluid in chamber 15 acting on the diaphragm 11. As the diaphragm is deflected to the normal position, the member 17 is moved to the left by the application valve 19 as it is seated by spring 21, and by the exhaust valve 71 as it is unseated by spring 73. With the application valve seated, the supply of fluid from the reservoir to the brake cylinders is cut off and with the exhaust valve unseated, fluid under pressure is vented from the brake cylinders to the atmosphere by way of pipe 74, chamber 52 in the double check valve device 4, pipe 75, chamber 15 in the brake valve device and past the unseated exhaust valve, thereby releasing the brakes.

If for any reason, such as incapacitation, the operator's foot is removed from the button 49 of the pedal device, spring 46 expands, pushing the button 49 away from the foot plate 41 and relieving the pressure on valve 43. This permits the pressure of fluid in conduit 44 below the valve 43 to unseat said valve which permits fluid under pressure to be vented from the emergency valve piston chamber 32 to the atmosphere through the conduit 44, past the unseated valve 43 to chamber 42 and from thence to the atmosphere through port 82.

The rate of venting of fluid under pressure from the emergency valve piston chamber 32 exceeds the rate of supply through port 81, so that the pressure in chamber 32 is reduced. This permits the pressure of fluid in chamber 36 to move the valve piston 31 away from the seat rib 34 against the opposing pressure of spring 33. Fluid at reservoir pressure then flows from chamber 36 to chamber 35 and from thence through chamber 83, past the check valve 37, and through pipe 84 to chamber 51 of the double check valve device 4.

In chamber 51 of the double check valve device, the pressure of fluid acting on the check valve 50 shifts said check valve to its right hand position in which communication from chamber 52 to pipe 74 is cut off and said pipe is connected to chamber 51 from which fluid under pressure flows through pipe 74 to brake cylinders 6 and applies the brakes.

When an automatic application of the brakes is effected in the manner just described, the pressure in chamber 83 below the emergency valve check valve 37 has to build up sufficiently to overcome the pressure of spring 38 before the check valve will raise to permit flow of fluid to pipe 84 and the maximum pressure obtainable in pipe 84 is less than reservoir pressure in chamber 83 of the emergency valve device by an amount equal to the valve of the spring 38. This is necessary in order to facilitate a release of the brakes after an automatic application, as will now be described.

To release the brakes, after an automatic application, the pedal device is depressed to effect the maximum application of the brakes, which permits fluid at reservoir pressure to flow through pipe 75 to chamber 52 in the double check valve device and act on the check valve 50. The reservoir pressure in chamber 52 being greater than the reduced pressure in chamber 51, the pressure of fluid in chamber 52 shifts the check valve 50 to its left hand position, in which position, pipe 74 is connected to chamber 52. With the check valve 50 in its left hand position, the pedal device 3 is permitted to return to its normal release position, in which position, fluid under pressure is vented from the brake cylinders 6 in the same manner as hereinbefore described.

When the pedal device is operated to release the brakes after an automatic application, the valve 43 in the pedal device is seated by foot pressure on the button 49. This permits the fluid pressures to equalize on the opposite sides of the emergency valve piston 31 and the spring 33 to seat said valve piston against the seat rib 34, which cuts off the supply of fluid under pressure to chamber 83. It will be evident that in releasing after an automatic application of the brakes, when the check valve 50 of the double check valve device is shifted to its left hand position, the fluid in chamber 83 and pipe 84 will be bottled up, so that when the pressure in chamber 52 is reduced to slightly below the pressure in chamber 51, the check valve 50 will tend to move again to its right hand or automatic application position. This is prevented however because leakage around the check valve 50 will permit the pressure in chamber 51 to reduce at substantially the same rate as the pressure reduces in chamber 52.

Piston chamber 59 of the circuit breaker device is connected through passage 76 to chamber 52 of the double check valve device at one time and with the check valve 50 in the right hand or automatic application position, chamber 59 is connected through passage 76 to chamber 51 in the double check valve device. Thus the circuit breaker piston 53 is always subject to the pressure of fluid supplied to the brake cylinder and when the brake cylinder pressure is built up sufficient to overcome the opposing pressure of spring 61 acting on said piston, said piston moves the contact 54 out of engagement with the fixed contacts 62 and 63, so as to open the control circuit of the power unit on the bus. Spring 61 may be of such value as to permit opening of the control circuit whenever the brakes are applied, but I prefer the spring to be of such value as to prevent the control circuit from being opened by a brake cylinder pressure less than obtained in an automatic application of the brakes.

When an automatic application of the brakes is effected, as hereinbefore described, there is a continual loss of fluid from the reservoir 7 due to flow through port 81 in the emergency valve piston 31 and past the unseated valve 43 in the pedal device 39. This is objectionable if allowed to continue over a long period of time, as when the operator leaves the vehicle, and in order to prevent such from occurring, the combined cut-out cock and circuit breaker device 5 is turned from the normal position A to the position B. In position B communication between reservoir pipe 77 and pipe 78 through port 79 in the plug valve 65 is closed, so that fluid under pressure is prevented from flowing to the emergency valve device. In position B the circuit breaker contact 68 is moved out of engagement with contacts 69 and 70, so that the control circuit of the power unit is opened. This is desirable in order to prevent the operator from operating the vehicle with the cut-out cock in the closed position B in which the automatic application feature is rendered inoperative. It will be noted that to operate the vehicle, the cut-out cock must be returned to the normal position A in order to close the control circuit through the circuit breaker contacts 69, 68 and 70.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake cylinder, a brake valve device for supplying fluid under pressure to said brake cylinder and for venting fluid under pressure from said brake cylinder to the atmosphere, and an emergency valve device operative upon a reduction in fluid pressure to supply fluid under pressure to said brake cylinder, of a pedal device for controlling the operation of said brake valve device, and valve means associated with said pedal device for controlling the operation of said emergency valve device, said valve means comprising a valve, a spring acting on said valve, and a plunger engaging said spring and normally subject to the pressure of an operator's foot for seating said valve, said valve being operative automatically upon relief of foot pressure on said plunger for reducing the pressure on said emergency valve device.

2. In a vehicle having a fluid pressure brake and a motive power controlled circuit, the combination with a reservoir supplied with fluid under pressure and a brake cylinder, of a valve device having a connection to said reservoir and to said brake cylinder for supplying fluid under pressure from one to the other, a cock in the connection to said reservoir for closing communication from said reservoir to said valve device, and a circuit breaker device associated with said cock for opening the motive power control circuit when said cock is operated to close said communication.

3. In a vehicle having a fluid pressure brake and a motive power control circuit, the combination with a reservoir supplied with fluid under pressure, and a brake cylinder, of a valve device for controlling the supply of fluid under pressure from said reservoir to said brake cylinder, a circuit breaker device subject to the pressure of fluid in said brake cylinder for opening said motive power control circuit upon a predetermined increase in brake cylinder pressure, a cock for cutting off the supply of fluid under pressure from said reservoir to said valve device and a circuit breaker device associated with said cock for opening said motive power control circuit when the supply of fluid under pressure to said valve device is cut off.

4. In a fluid pressure brake, the combination with a fluid pressure supply reservoir and a brake cylinder, of means controlled by manual pressure, a brake valve device operated by said means upon an increase in manual pressure for supplying fluid under pressure from said reservoir to said brake cylinder and operated upon the relief of manual pressure for releasing fluid under pressure from said brake cylinder, auxiliary control means associated with the manually controlled means and normally subject to manual pressure, an emergency valve device operative upon the relief of manual pressure on said auxiliary control means for supplying fluid under pressure from said reservoir to said brake cylinder, pressure reducing means interposed in the communication from said emergency valve device to said brake cylinder, and a double check valve operative by the pressure of fluid supplied through said pressure reducing means for closing communication from said brake valve device to said brake cylinder, said double check valve being operative by fluid at reservoir pressure supplied through said brake valve device for closing communication from said pressure reducing means to said brake cylinder after the brake cylinder is supplied with fluid under pressure from said pressure reducing means, said brake valve being operative upon the relief of pressure on said manually controlled means to release fluid under pressure from said brake cylinder when said auxiliary control means is subject to manual pressure.

In testimony whereof I have hereunto set my hand, this 18th day of November, 1930.

HARRY J. WINTER.